United States Patent [19]

Toreson et al.

[11] Patent Number: 4,717,982
[45] Date of Patent: Jan. 5, 1988

[54] ELECTRICAL CONNECTOR RETAINING ASSEMBLY FOR FACILITATING REMOVABLE MOUNTING OF A RIGID DISK DRIVE

[75] Inventors: James S. Toreson, Mountain View, Calif.; Jeffrey G. Lessner, Clinton, Md.

[73] Assignee: Xebec, Carson City, Nev.

[21] Appl. No.: 907,165

[22] Filed: Sep. 15, 1986

Related U.S. Application Data

[63] Continuation of Ser. No. 646,588, Aug. 31, 1984, abandoned.

[51] Int. Cl.⁴ ................. G11B 33/00; G11B 33/06
[52] U.S. Cl. ......................... 360/137; 364/708
[58] Field of Search ............ 360/86, 60, 97–99, 360/137; 369/75.1, 292; 339/119 R, 121, 125 R, 126 R, 198 GA, 198 H; 361/390, 391–394, 408, 415, 426–429; 174/117 F, DIG. 9; 364/708

[56] References Cited

U.S. PATENT DOCUMENTS

| | | | |
|---|---|---|---|
| 3,691,432 | 9/1972 | Edfors et al. | 361/428 X |
| 3,818,283 | 6/1974 | Ward | 361/391 X |
| 4,062,049 | 12/1977 | Dirks | 360/98 X |
| 4,063,683 | 12/1977 | Jones | 339/119 R |
| 4,134,632 | 1/1979 | Lindberg et al. | 339/125 R X |
| 4,410,928 | 10/1983 | Aramaki | 361/426 X |
| 4,566,054 | 1/1986 | Shimoda et al. | 361/422 |
| 4,633,350 | 12/1986 | Hanson | 360/98 |

FOREIGN PATENT DOCUMENTS

| | | | |
|---|---|---|---|
| 2146970 | 4/1972 | Fed. Rep. of Germany | 361/429 |
| 1102691 | 2/1968 | United Kingdom | 361/428 |

OTHER PUBLICATIONS

Shugart Associates, "The Headstrong Product Family", printed Mar., 1980.
Baker et al., "Rack Mounted Diskette Storage Unit", IBM Tech. Disc. Bull., vol. 19, No. 10, Mar., 1977.
Thoresz, "Cable Retractor System", IBM Tech. Disc. Bull., vol. 22, No. 7, Dec., 1979.

Primary Examiner—Stuart N. Hecker
Assistant Examiner—Benjamin E. Urcia
Attorney, Agent, or Firm—Thomas E. Schatzel

[57] ABSTRACT

An interconnection assembly permits a Winchester-type rigid magnetic disk storage unit, inclusive of the disk drive mechanism, to be plug-in removable from a systems unit or an add-on peripheral data storage subsystems unit of a personal computer system.

5 Claims, 4 Drawing Figures

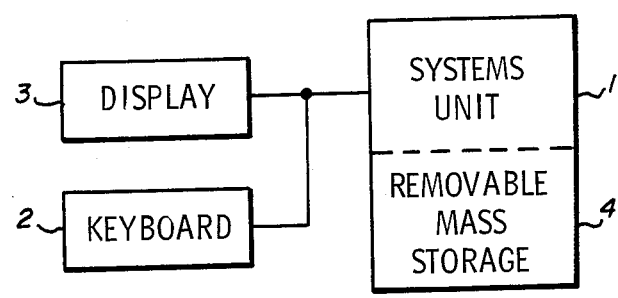
Fig_1
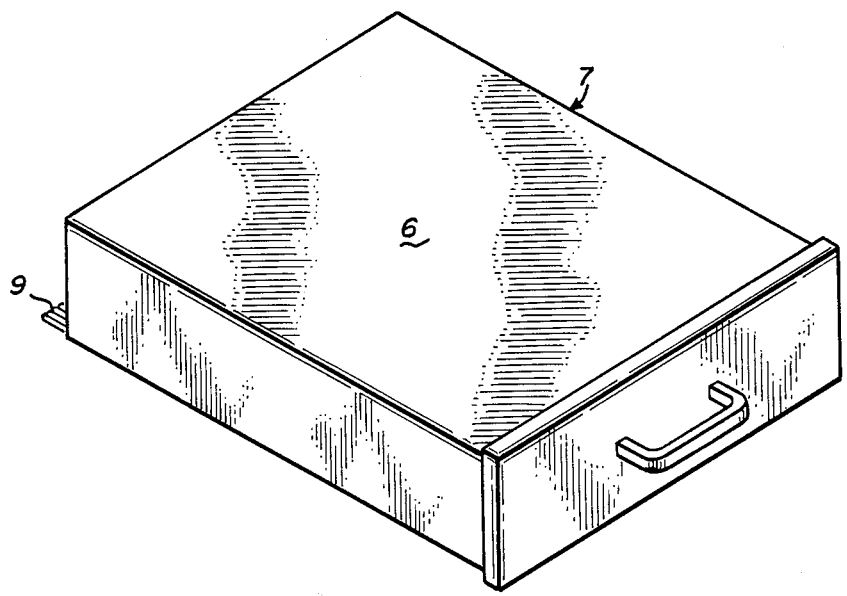
Fig_2

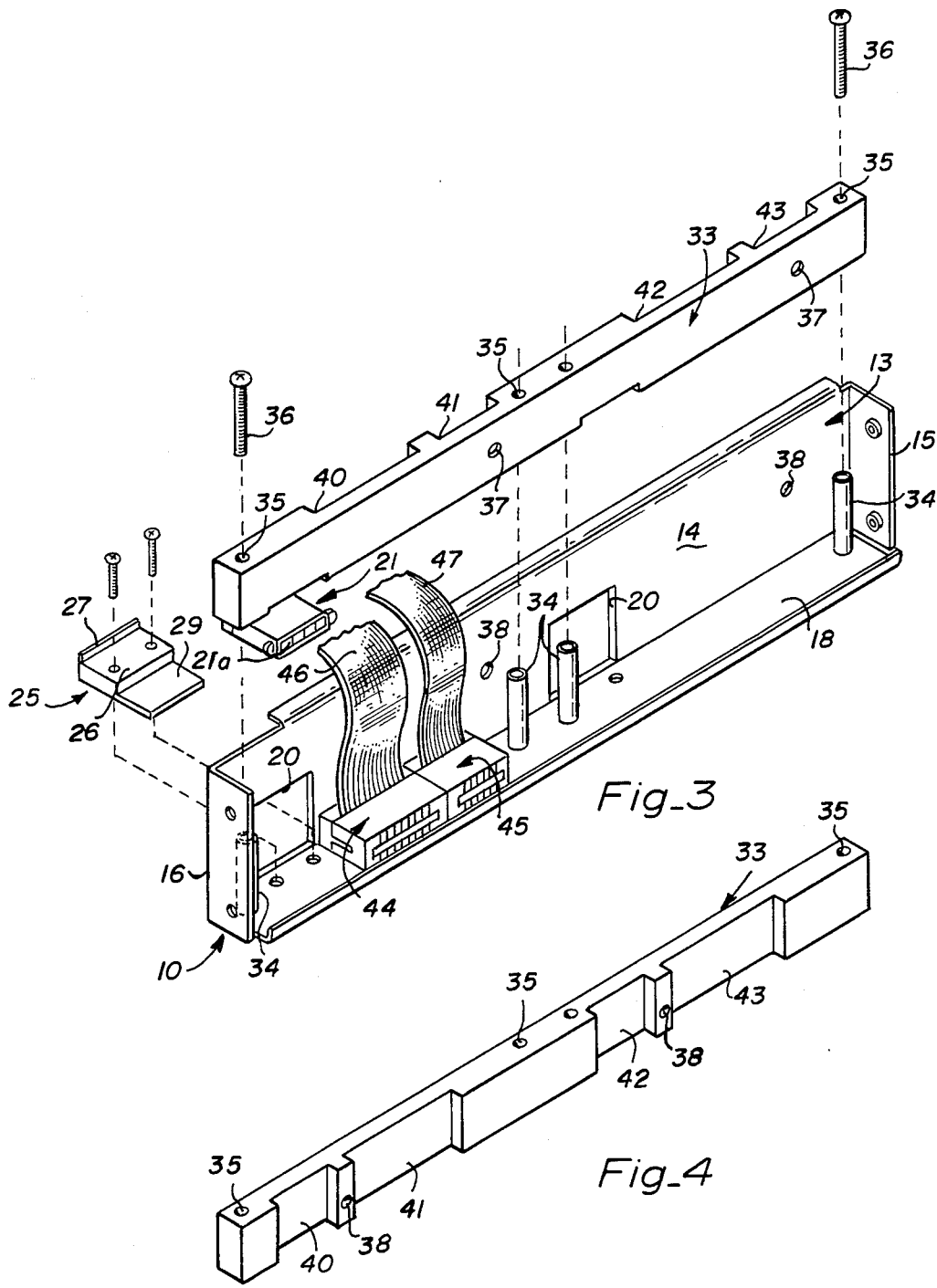

ELECTRICAL CONNECTOR RETAINING ASSEMBLY FOR FACILITATING REMOVABLE MOUNTING OF A RIGID DISK DRIVE

This is a continuation of co-pending application Ser. No. 06/646,588 filed on 8/31/84, now abandoned.

BACKGROUND OF THE INVENTION

1. Field of the Invention

The present invention relates to an interconnection assembly for personal computer systems, and more particularly, to an interconnection assembly for a magnetic disk storage unit of the Winchester-type including a disk drive.

2. Description of the Prior Art

It is well known for personal computer systems to include both rigid disk magnetic storage units, as well as floppy disk magnetic storage units. More specifically, it is known for the rigid disk magnetic storage units to be of the Winchester-type wherein a rigid disk and an associated read/write magnetic transducer are permanently mounted within a sealable housing which, in turn, is mounted to a disk drive means. As compared to floppy disk units, the Winchester-type disk units are capable of storing substantially more information and operating at substantially increased speeds. For example, typical two-sided floppy disks currently used in personal computer systems can store about 360,000 bytes of data, whereas a typical hard disk unit may store about ten megabytes of data (one megabyte is approximately equal to one million bytes).

Conventional practice in the design and manufacture of many personal computer systems is to build a Winchester-type disk unit and disk drive into the computer's systems unit as an essentially permanent or "fixed" component. Such design is found, for example, in the IBM PC XT manufactured by IBM Company. In other words, the Winchester-type disk unit in such systems forms an intergal part of the systems unit and is not readily, or conveniently, removable by an ordinary user of the computer. By way of contrast, floppy disks are readily removable from the systems unit, although the drive and transducer units for the floppy disks are, of course, a permanent part of the systems unit.

It is also known to provide so-called "add-on" peripheral storage subsystem units for personal computers and the like. These add-on subsystem units are typically "stand-alone" devices which are connected, via data-transmitting cable, to the systems unit to provide additional memory capacity for the computing system. It is known that these add-on subsystem units can be designed to handle either floppy disks or hard disks of the Winchester-type built permanently into the unit.

The fixed nature of Winchester-type disk units in such conventional personal computer systems, whether as a part of a systems unit or an add-on subsystem, has several shortcomings. One shortcoming arises in situations where there is a periodic need to completely remove data from the Winchester-type disk system, say for security purposes. Such a security need may arise, for example, in military or government offices where material on a magnetic media may be of a classified nature such that it, or the media upon which it is stored, must be removed from a computer and stored in a secure location when not in use. In such instances, data on fixed Winchester-type disks in a computer system must be first transferred to a floppy disk or to a so-called "streaming tape" which can be removed from the system, then the Winchester-type disk must be erased. Such copying is expensive and time consuming. For example, about thirty minutes is required to copy the contents of a ten megabyte hard disk onto a conventional one-quarter inch streamer tape and, in addition, there is the cost of the mechanism for the streamer tape as well as the tape itself. Accordingly, streaming tapes are not considered to be practical by software engineers for providing "on-line" storage for personal computer systems. Likewise, the copying of information from a fixed disk system onto floppy disks is similarily time consuming, expensive and, in many instances, impractical.

Even when there is no security need to remove data from a Winchester-type fixed disk, it is often desirable to transfer data from the Winchester-type disk onto another storage media so as to provide a "back-up" or archival copy of the information for safe-keeping, or to provide additional "on line" storage. However, whether the need is to remove information for erasure or merely for copying, the process of removing data from Winchester-type disks in conventional personal computer systems is slow, inconvenient and expensive. Further, the shortcomings of presently available data transfer means are likely to become more acute as the storage capabilities increase for the Winchester-type hard disk units which are used in personal computer systems because, with more data stored on the hard disks, the transfer time to back-up streamer tapes or floppy disk systems is proportionately increased, as is the amount of streamer tape required or the number of floppy disks which must be used.

SUMMARY OF THE PRESENT INVENTION

It is an object of the present invention to provide ways and means whereby a Winchester-type hard disk unit may be removably mounted within a systems unit or with an add-on storage subsystem unit in a personal computer system or the like. More particularly, it is an object of the present invention to provide ways and means whereby an integral unit, comprising a Winchester-type rigid magnetic data storage disk together with integral drive means for the disk can be mounted in a computing system for convenient removal by a user of a personal computer system.

In accordance with the preceding objects, the present invention, in its preferred embodiments, provides an interconnection assembly for removably mounting a Winchester-type magnetic data storage disk unit, inclusive of disk drive means, within a systems unit or within an add-on storage subsystem of personal computer system wherein the interconnection assembly includes a bulkhead bracket which is fixedly securable within housing for the systems unit, or within the housing for the add-on storage subsystem unit, and which has a shelf means to stationarily support electrical connector members having strip-like signal carrying cables connected thereto. Associated with the bulkhead bracket is a slidably-mounted retaining rail member which stationarily secures the electrical connector members against the shelf means, with the strip-like cables held between the rail means and a planar face of the bulkhead bracket.

A primary advantage provided by the preferred embodiments of the present invention is the provision of a Winchester-type rigid disk magnetic data storage disk unit, inclusive of disk drive means, which is readily removable from a bulkhead bracket within a housing for a systems unit or add-on storage subsystem unit of a personal computer system solely by disengaging the Winchester-type unit from the connector means held stationary by the bulkhead bracket. Accordingly, the present invention provides a removable Winchester-type disk system which affords convenient on-line or back-up data storage in conventional personal computer systems; in practice for example, a system according to the present invention has shown the capability of requiring less than thirty seconds to copy the data contents of a 20 megabyte fixed Winchester-type disk.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a computer system incorporating the present invention;

FIG. 2 is a pictorial view of a Winchester-type rigid magnetic data storage disk unit for use in the system of FIG. 1;

FIG. 3 is a pictorial view, shown in exploded position for ease of comprehension, of an interconnection assembly for use with the system of FIG. 1 and the Winchester-type rigid magnetic data storage disk unit of FIG. 2; and FIG. 4 is a pictorial view of a particular part of the assembly of FIG. 2 shown from the opposite side.

DETAILED DESCRIPTION OF THE PREFERRED EMBODIMENTS

FIG. 1 illustrates the basic components of a typical personal computer system. The system includes a systems units 1 which includes the basic computational circuitry of the computer, a keyboard 2 which permits a user of the computer to enter data and commands to the systems unit, a display means 3 to visually display the materials entered by the user or the results of computations performed by the systems unit. Further a typical computer system includes mass storage means 4 which provides a space to store information, such as data which has been entered via the keyboard, programs for controlling the systems units, or information which has been generated by the computational operations of the systems unit. In various conventional personal computer systems, it is known to provide a permanently fixed Winchester-type rigid disk unit in the systems unit inclusive of a disk drive mechanism. In accordance with one embodiment the present invention and in contrast to conventional practice, the mass storage means 4 in the system of FIG. 1 may be considered to include one or more Winchester-type rigid magnetic disk units which are mounted within the systems unit 1 housing 1 for ready removal and replacement by a user of the system.

In FIG. 2, a representative one of the removable Winchester-type rigid magnetic disk data storage units 7 may be seen to comprise a housing 6 which permanently contains a rigid magnetic recording disk, drive means to rotate the disk, magnetic transducer means to selectively read or write magnetic encodings upon the faces of the magnetic disk, means to locate the transducer at selected locations upon the face of the disk, and circuit means to control the operation of the disk drive, the read/write transducer, and the locating means in response to commands from the systems unit 1. Further the unit 7 includes power conductor pins 9 for connection to a source of electrial energy to provide power to the disk drive and other operating components within the housing 6. The unit 7 also includes at least one other set of signal-carrying pins (hidden from view in FIG. 2) for electrical connection to the systems unit 1 so that informational signals can be conveyed back and forth between the two units. Such information signals can include, for instance, command signals from the systems unit 1, data to be written upon the hard disk, or data which is read from the disk. In any event, such informational signals are of relatively low energy as compared to the disk drive power signals and, hence, require separate wiring and connectors.

In FIG. 3, there is illustrated one embodiment of an interconnection assembly 10 according to the present invention for removably connecting the Winchester-type rigid magnetic disk data storage unit 7, inclusive of disk drive means to the systems unit 1. The interconnection assembly 10 includes a bulkhead bracket, generally designated by numeral 13, which is adapted for installation at an appropriate location within the systems unit 1 to mount two Winchester-type maqnetic disk units 7 in side-by-side relationship. Accordingly, the illustrated bulkhead bracket 13 is relatively elongated, has a broad planar face 14 and includes integral flanges 15 and 16 formed at its respective ends for mounting to appropriate structural members within the systems unit 1 so that the bulkhead bracket is held stationary.

Further, the bulkhead bracket 13 includes a shelf 18 which is rigidly fixed to the bracket by welding or other appropriate means to provide a horizontal surface which extends normal to the planar face 14. Alternatively, the shelf 18 can be formed as an integral part of the bulkhead bracket by bending a portion of the bracket to a position at right angle to the planar face 14. The shelf 18 should be sufficiently long to extend essentially the entire length of the bulkhead member bracket.

Through the face 14 of the bulkhead bracket is formed at least one aperture 20 of sufficient width and height to receive a standard power connector or socket such as the one indicated generally by numeral 21. (In terms of the preceding discussion relating to FIG. 2, the power connector socket 21 would be utilized to connect the pins 9 shown on the data storage unit 7 in FIG. 2 to a source of electrical energy for the disk drive motor; accordingly, the connector 21 includes pin-receiving apertures 21a.) In the preferred embodiment 10, a spacer member 25 is removably mounted to the bulkhead bracket 13 within the aperture 20 to support the power connector 21 in a generally stationary condition. Thus, the body of the illustrated spacer member 25 has a step portion 26 and a lip portion 27, where the step portion 26 is provided to engage a corresponding step on the power connector 21 (hidden from view in the drawings) and a lip 29 is provided to engage the end of the power connector. Being removable, the spacer member 25 can be interchanged with other spacer members of different shapes to accommodate power connectors of various shapes.

As shown in both FIGS. 3 and 4, the interconnection assembly 10 further includes a retaining rail member 33 which is mounted to extend lengthwise of the planar face 14 of the bulkhead bracket 13 and which, for convenience of manufacture, may be generally rectangular in transverse cross section. The retaining rail 33 is slidably positioned on the bulkhead bracket 13 by at least two upstanding guide pins 34 which extend through associated guide bores 35 formed through the retaining rail member 33. The guide pins 34 are fixed at their lower ends to the shelf member 18 at spaced-apart locations to extend from the shelf with their longitudinal axis parallel to the planar face 14. In assembled condition, the guide pins 34 extend through the guide bores 35 to hold the rail slidably flush against the planar face 14.

The retaining rail 33 can be secured in a fixed position relative to the bulkhead bracket 13 by means such as locating screws or bolts (not shown) which extend through apertures 37 formed in the retaining rail 33 in registry with receiving apertures formed in the face 14 of the bulkhead bracket 13. Also, retaining screws 36 can be provided to thread axially into the guide posts 34. Thus, it can be understood that the position of the retaining rail 33 may be adjusted on the guide pins 34 until such time as the retaining rail abuts the power connector socket 21 positioned on the shelf member 18. Preferably, a thin strip of foam or other resilient material (not shown) is secured along the bottom edge of the retaining rail to resiliently press the connector socket 21.

In the completed assembly in FIG. 3, there are also positioned on the shelf 18 additional electrical connector sockets 44 and 45 which carry strip-like electrical conductor cables 46 and 47, respectively, to convey informational signals from the systems unit to the Winchester-type magnetic disk unit. As mentioned above, such informational signals are low-energy signals which convey data or commands to the Winchester-type disk unit from the systems unit, or visa versa.

As best shown in FIG. 4, the surface of the retaining rail 33 which faces the planar face 14 of the bulkhead bracket 13 include slots 40, 41, 42, and 43 which are formed to permit passage of the strip-like electrical conductor cables 46 and 47 from the connector sockets 44 and 45 between the retaining rail 33 and the adjacent planar face 14 of the bulkhead bracket 13.

At this point, it can be appreciated that the illustrated bulkhead bracket 13 provides connections for two Winchester-type magnetic storage units 7 in side-by-side relationship. Accordingly, if the bracket were intended for just one such unit, the bracket length could be reduced by one half. It may also be appreciated that the disclosed bracket is preferably utilized with the so-called "one-half height" Winchester-type magnetic storage units; however, the underlying concept of the invention is the same whether full or one-half height Winchester-type disk storage units are employed. Still further, it should be appreciated that the disclosed invention is not strictly limited in application to so-called personal computers but can readily be applied to other computer systems which employ fixed integral magnetic storage disk systems.

In usage and operation, the bulkhead bracket 13 is fixedly, mounted within the housing 6 of a systems unit 1 of a personal computer system or within the housing of an add-on storage subsystem unit from which has been removed the fixed Winchester-type magnetic data storage unit, or a permanent floppy disk drive unit. Then, the power conductor cables for the drive unit are connected to socket member 21 and the signal-carrying conductors are connected to the sockets 44 and 45 as is appropriate. Next, the connector sockets 44 and 45 are repositioned on the shelf 18 of the bulkhead bracket 13 as shown in FIG. 3, and the retaining rail 33 is located on the guide posts 34 with the strip-like conductors 46 and 47 extending across the planar face 14 of the bulkhead bracket 13 within the slots 40 and 41 provided in the adjacent face of the retaining rail 33. Then, the retaining rail 33 is slidably moved along the guide posts 34 unitl the rail abuts the connector sockets 44 and 45 and, thereby, holds the sockets stationarily in position along the shelf 18 while the strip-like cables 46 and 47 are trained behind the rail.

With this assemblage complete, the systems unit 1 is ready to receive a Winchester-type magnetic disk unit such as unit 7 shown in FIG. 2 which as power-conducting pins 9 and signal-carrying pins appropriately located to be matingly received by the connector sockets 21, 44 and 45 stationarily held by the bulkhead bracket 13. Just as the Winchester-type desk unit 1 can be readily "plugged-in" to the systems unit or into an add-on peripheral storage subsystem, it can be readily removed from the housings merely by disengaging the Winchester-type unit from the connectors held stationary by the bulkhead bracket 33.

Although the present invention has been described in terms of the presently preferred embodiment, it is to be understood that such disclosure is not to be interpreted as limiting. Various alternatives and modifications, in addition to those discussed in the preceding will no doubt become apparent to those skilled in the art after having read the above disclosure. Accordingly, it is intended that the appended claims be interpreted as covering all alterations and modifications as fall within the true spirit and scope of the invention.

We claim:

1. An electrical innerconnection assembly for removably mounting a rigid disk drive within a housing comprising:
    a. a bulkhead bracket fixed secured within a rigid disk drive housing, the bulhead bracket having a planar face oriented to be parallel to a panel containing electrical innerconnect means of a rigid disk drive when said disk drive is in an operative position in said housing and said electrical innerconnect means are electrically connected to electrical connector members, and a shelf projecting perpendicularly from said face to provide support for said electrical connector members, said electrical connector members having strip like cables connected thereto, said electrical connector members abutting said planar face and said shelf and oriented to face said panel of said disk drive positioned to receive said electrical innerconnect means of said rigid disk drive, and guide pin members fixed in parallel spaced-apart relationship and projecting perpendicularly from said shelf; and
    b. a retaining rail removably mounted on the bulkhead bracket to secure said electrical connector members in place on the bulkhead bracket against said shelf and said planar face, with said strip-like cables held between the retaining rail and said planar face, the surface of the retaining rail adjacent said planar face of the bulkhead bracket has spaced-apart slots to receive said strip-like cables between the retaining rail and said planar face such that said strip-like cables are held flush against said planar face, the widths of said slots corresponding to the widths of said strip-like cables such that the lateral movement of the strip-like cables is restricted, guide bores formed through said retaining rail at spaced-apart locations similar to the spaced-apart relationship of said guide pin members to receive said repective guide pin members so that the retaining rail may be slidably positioned on said guide pin members adjacent said planar face of the bulkhead bracket, whereby said storage disk unit is readily removable from the bulkhead bracket by disengaging the unit from said electrical connector member.

2. The innerconnection asembly of claim 1 wherein,
the bulk head bracket includes fange members about the terminal ends of the planar face and projecting from said planar face and from said shelf; and
the retaining rail is positioned intermediate said flange members.

3. The interconnect assembly of claim 2 wherein
the bulkhead bracket includes an aperture to receive a power connector to interconnect the disk drive to an external electrical power source;
a spacer member mounted to the bulkhead bracket to support said power connector in a stationary position.

4. The interconnect assembly of claim 3 wherein
said spacer has a surface shape means to interlock with the surface shape of said power connector.

5. In a personal computer system having a unit housing to accommodate a disk drive unit, the improvement comprising:
a. a bulkhead bracket fixed secured within a rigid disk drive mounting housing, the bulkhead bracket having a planar face oriented to be parallel to a panel containing electrical innerconnect means of a rigid disk drive when said disk drive is in an operative position in said housing and said electrical innerconnect means are electrically connected to electrical connector members, and a shelf projecting perpendicularly from said face to provide support for said electrical connector members, said electrical connector members having strip-like cables connected thereto, said electrical connector members abutting said planar face and said shelf and oriented to face said panel of said disk drive and positioned to receive said electrical innerconnect means of said rigid disk drive, and guide pin members fixed in parallel spaced-apart relationship and projecting perpendicularly from said shelf; and
b. a retaining rail removably mounted on the bulkhead bracket to secure said electrical connector members in place on the bulkhead bracket agains said shelf and said planar face, with said strip-like cables held between the retaining rail and said planar face, the surface of the retaining rail adjacent said planar face of the bulkhead bracket has spaced-apart slots to receive said strip-like cables between the retaining rail and said planar face such that said strip-like cables are held flush against said planar faces, the width of said slots corresponding to the widths of said strip-like cables such that the lateral movement of the strip-like cables is restricted, guide means positioned at spaced-apart locations similar to the space-apart relationship of siad guide pin members and for receiving said respective guide pin members so that the retaining rail may be interlocked with said guide pin members flush against said planar face of the bulkhead bracket, whereby said disk unit is readily removable from the bulkhead bracket by disengaging the unit from said electrical connector means.

* * * * *